United States Patent
Hardy et al.

(10) Patent No.: US 11,132,138 B2
(45) Date of Patent: *Sep. 28, 2021

(54) CONVERTING LARGE EXTENT STORAGE POOLS INTO SMALL EXTENT STORAGE POOLS IN PLACE

(71) Applicant: International Business Machines Corporation, Armonk, NY (US)

(72) Inventors: Clint A. Hardy, Tucson, AZ (US); Karl Allen Nielsen, Tucson, AZ (US); Matthew Joseph Kalos, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/563,109

(22) Filed: Sep. 6, 2019

(65) Prior Publication Data

US 2021/0072913 A1    Mar. 11, 2021

(51) Int. Cl.
*G06F 3/06* (2006.01)
*G06F 9/50* (2006.01)
*G06F 9/52* (2006.01)

(52) U.S. Cl.
CPC .......... *G06F 3/0644* (2013.01); *G06F 3/0626* (2013.01); *G06F 3/0689* (2013.01);
(Continued)

(58) Field of Classification Search
CPC .... G06F 3/0644; G06F 3/0626; G06F 3/0689; G06F 9/5016; G06F 9/5061; G06F 9/52; G06F 2209/5011
See application file for complete search history.

(56) References Cited

U.S. PATENT DOCUMENTS

| | | | |
|---|---|---|---|
| 6,453,383 B1 * | 9/2002 | Stoddard | G06F 3/0607 707/999.202 |
| 7,146,465 B2 | 12/2006 | Korgaonkar | |

(Continued)

FOREIGN PATENT DOCUMENTS

| | | |
|---|---|---|
| CN | 107291395 A | 10/2017 |
| CN | 107422990 A | 12/2017 |

(Continued)

OTHER PUBLICATIONS

Zhang et al., "RAID+: Deterministic and Balanced Data Distribution for Large Disk Enclosures," Proceedings of the 16th USENIX Conference on File and Storage Technologies, Feb. 12-15, 2018, pp. 279-293.

(Continued)

*Primary Examiner* — Eric Cardwell
(74) *Attorney, Agent, or Firm* — Zilka-Kotab, P.C.

(57) ABSTRACT

A computer-implemented method, according to one approach, is for converting an existing storage pool into an intended storage pool in place. The computer-implemented method includes: identifying a request to convert the existing storage pool having a first extent size into the intended storage pool having a second extent size, where the first extent size is larger than the second extent size. For each volume in the existing storage pool: a temporary pause/lock is performed on a volume segment table (VST) entry which corresponds to the given volume, and a new structure is applied to the VST entry. The new structure divides existing physical extents associated with the VST entry into two or more smaller physical extents. Furthermore, for each of the ranks in the existing storage pool, the given rank is converted from the first extent size to the second extent size.

20 Claims, 10 Drawing Sheets

(52) U.S. Cl.
CPC .......... *G06F 9/5016* (2013.01); *G06F 9/5061* (2013.01); *G06F 9/52* (2013.01); *G06F 2209/5011* (2013.01)

(56) References Cited

U.S. PATENT DOCUMENTS

| | | | |
|---|---|---|---|
| 7,574,560 B2 | 8/2009 | MacHardy et al. | |
| 8,073,816 B1* | 12/2011 | Luke | G06F 3/0605 |
| | | | 707/644 |
| 8,239,402 B1* | 8/2012 | Kumaresan | G06F 16/116 |
| | | | 707/769 |
| 8,539,008 B2 | 9/2013 | Faith et al. | |
| 8,578,092 B2 | 11/2013 | Arakawa | |
| 8,578,114 B2* | 11/2013 | Jennas, II | G06F 3/0613 |
| | | | 711/162 |
| 8,595,458 B2 | 11/2013 | Hatfield | |
| 8,806,126 B2 | 8/2014 | Kawakami et al. | |
| 8,930,623 B2 | 1/2015 | Wu et al. | |
| 9,069,468 B2 | 6/2015 | Mehra et al. | |
| 9,495,478 B2 | 11/2016 | Hendrickson et al. | |
| 9,606,748 B2 | 3/2017 | Adkins et al. | |
| 9,779,015 B1 | 10/2017 | Oikarinen et al. | |
| 10,901,645 B1 | 1/2021 | Hardy et al. | |
| 2009/0300301 A1 | 12/2009 | Vaghani | |
| 2011/0185147 A1* | 7/2011 | Hatfield | G06F 3/061 |
| | | | 711/170 |
| 2013/0024640 A1* | 1/2013 | Reed | G06F 3/0665 |
| | | | 711/170 |
| 2015/0160884 A1 | 6/2015 | Scales et al. | |
| 2015/0278243 A1 | 10/2015 | Vincent et al. | |
| 2021/0073178 A1 | 3/2021 | Yin et al. | |

FOREIGN PATENT DOCUMENTS

| | | |
|---|---|---|
| EP | 2211262 A2 | 7/2010 |
| WO | 2013089680 A1 | 6/2013 |

OTHER PUBLICATIONS

Zhang et al., U.S. Appl. No. 16/258,211, filed Jan. 25, 2019.
Hardy et al., U.S. Appl. No. 16/118,367, filed Aug. 30, 2018.
Hardy et al., U.S. Appl. No. 16/563,072, filed Sep. 6, 2019.
Archlinux, "LVM," Wikipedia: Logical Volume Manager (Linux), Nov. 26, 2018, 19 pages, retrieved from https://wiki.archlinux.org/index.php/LVM#Move_physical_extents.
Notice of Allowance from U.S. Appl. No. 16/563,072, dated Sep. 29, 2020.
Hardy et al., U.S. Appl. No. 17/094,634, filed Nov. 10, 2020.
Corrected Notice of Allowance from U.S. Appl. No. 16/563,072, dated Dec. 4, 2020.
International Search Report and Written Opinion from PCT Application No. PCT/IB2020/057934, dated Dec. 15, 2020.

* cited by examiner

CONVERTING LARGE EXTENT STORAGE POOLS INTO SMALL EXTENT STORAGE POOLS IN PLACE

BACKGROUND

The present invention relates to data migration and/or conversion, and more specifically, this invention relates to converting data from large extent storage pools to small extent storage pools in place.

Extent pools in storage products may implement different extent sizes. For example, a 1 GB extent size may be implemented for a large extent pool and a 16 MB extent size may be implemented for a small extent pool. Some workloads may perform better in a small extent pool when compared to a large extent pool. It follows that in some situations a specific extent size is chosen by a client for a given storage pool, but over time, factors change such that a different extent size is desirable. For example, in some situations a storage system may experience an increase in demand for physical storage such that smaller extent sized storage pools are converted to larger extent sized storage pools.

However, existing processes for converting the extent size implemented by a given pool are time consuming and inefficient. For instance, conventional processes for converting the size of the extents in a storage pool require that the data first be migrated off to another physical storage pool before any changes can be made to the extent sizes. This process of migrating data is undesirable as it requires additional storage resources, processing bandwidth, time to physically copy all data to another storage medium, etc. There is therefore a desire for processes which are able to efficiently convert the size of extents in storage pools.

SUMMARY

A computer-implemented method, according to one approach, is for converting an existing storage pool into an intended storage pool in place. The computer-implemented method includes: identifying a request to convert the existing storage pool having a first extent size into the intended storage pool having a second extent size, where the first extent size is larger than the second extent size. For each volume in the existing storage pool: a temporary pause/lock is performed on a volume segment table (VST) entry which corresponds to the given volume, and a new structure is applied to the VST entry. The new structure divides existing physical extents associated with the VST entry into two or more smaller physical extents. Furthermore, for each of the ranks in the existing storage pool, the given rank is converted from the first extent size to the second extent size.

It should also be noted that data in the volumes is not migrated outside the existing storage pool while converting the existing storage pool into the intended storage pool. It follows that some of the approaches included herein are able to convert the extent size of the ranks in a data storage pool while the data remains in place. While this process does include some reordering of data before the actual change to rank extent sizes can occur, the data remains located in the given storage pool while the conversion is performed, thereby significantly increasing operational efficiency, reducing data storage consumption, decreasing performance delays, reducing network traffic (e.g., which would otherwise result from migrating the data), etc. These improvements are achieved due (at least in part) to the fact that the properties of the volumes allow for these various processes and sub-processes to convert the layout of the volumes and ranks into larger extent sizes.

The properties of the RST and/or VST allow for these improvements to be achieved such that migration of data to other storage pools or machines is not involved. The new structure also divides existing physical extents associated with the VST entry into two or more smaller physical extents such that the smaller physical extents align with the boundaries between the extents of the intended storage pool without any padding. This further increases the efficiency of storage space utilization, thereby improving performance of an overarching data storage system as a whole.

A computer program product, according to another approach, is for converting an existing storage pool into an intended storage pool in place. The computer program product includes a computer readable storage medium having program instructions embodied therewith. The program instructions are readable and/or executable by a processor to cause the processor to: perform the foregoing method.

A system, according to yet another approach, includes: a processor, and logic integrated with the processor, executable by the processor, or integrated with and executable by the processor. The logic is configured to: perform the foregoing method.

Other aspects and approaches of the present invention will become apparent from the following detailed description, which, when taken in conjunction with the drawings, illustrate by way of example the principles of the invention.

DETAILED DESCRIPTION

Figure 1:
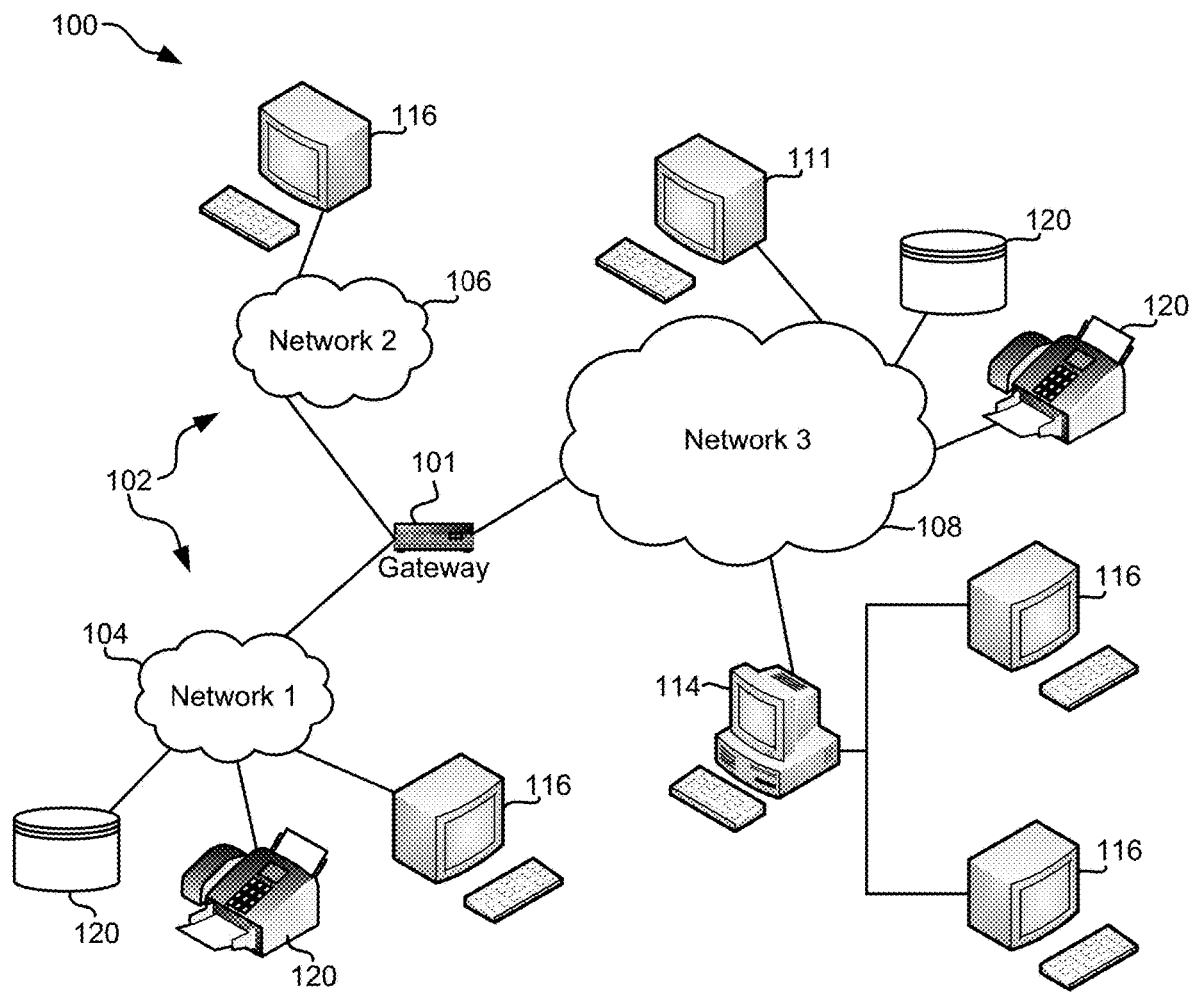
FIG. 1 is a representational view of a network architecture, in accordance with one approach.

The following description discloses several preferred approaches of systems, methods and computer program products for migrating data from a large extent pool to a small extent pool. Various approaches provide a method to create a correspondence between logical volume extents of the volume and physical offset locations within rank extents of the source storage pool, and migrate data from one or more ranks of the source storage pool to one or more ranks of the destination storage pool, utilizing the correspondence.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for converting the extent size of the ranks in a data storage pool while the data remains in place. By keeping the data located in the given storage pool while the conversion is performed, various ones of the approaches included herein are able to significantly increase operational efficiency of the system, e.g., as will be described in further detail below.

In one general approach, a computer-implemented method is for converting an existing storage pool into an intended storage pool in place. The computer-implemented method includes: identifying a request to convert the existing storage pool having a first extent size into the intended storage pool having a second extent size, where the first extent size is larger than the second extent size. For each volume in the existing storage pool: a temporary pause/lock is performed on a volume segment table (VST) entry which corresponds to the given volume, and a new structure is applied to the VST entry. The new structure divides existing physical extents associated with the VST entry into two or more smaller physical extents. Furthermore, for each of the ranks in the existing storage pool, the given rank is converted from the first extent size to the second extent size.

In another general approach, a computer program product is for converting an existing storage pool into an intended storage pool in place. The computer program product includes a computer readable storage medium having program instructions embodied therewith. The program instructions are readable and/or executable by a processor to cause the processor to: perform the foregoing method.

In yet another general approach, a system includes: a processor, and logic integrated with the processor, executable by the processor, or integrated with and executable by the processor. The logic is configured to: perform the foregoing method.

FIG. 1 illustrates an architecture 100, in accordance with one approach. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one approach.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some approaches.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
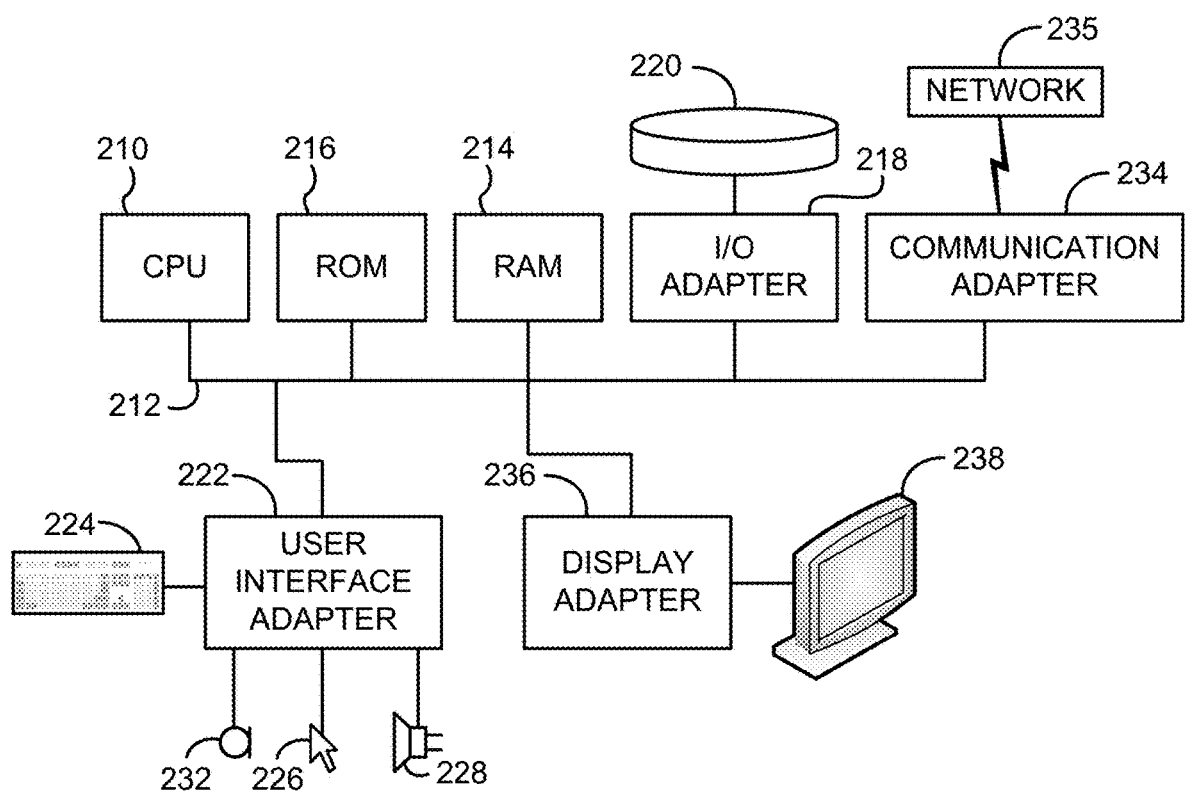
FIG. 2 is a representative hardware environment that may be associated with the servers and/or clients of FIG. 1, in accordance with one approach.

FIG. 2 shows a representative hardware environment associated with a user device 116 and/or server 114 of FIG. 1, in accordance with one approach. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred approach may also be implemented on platforms and operating systems other than those mentioned. A preferred approach may be written using XML, C, and/or C++ language, or other programming languages, along with an object oriented programming methodology. Object oriented programming (OOP), which has become increasingly used to develop complex applications, may be used.

Figure 3:
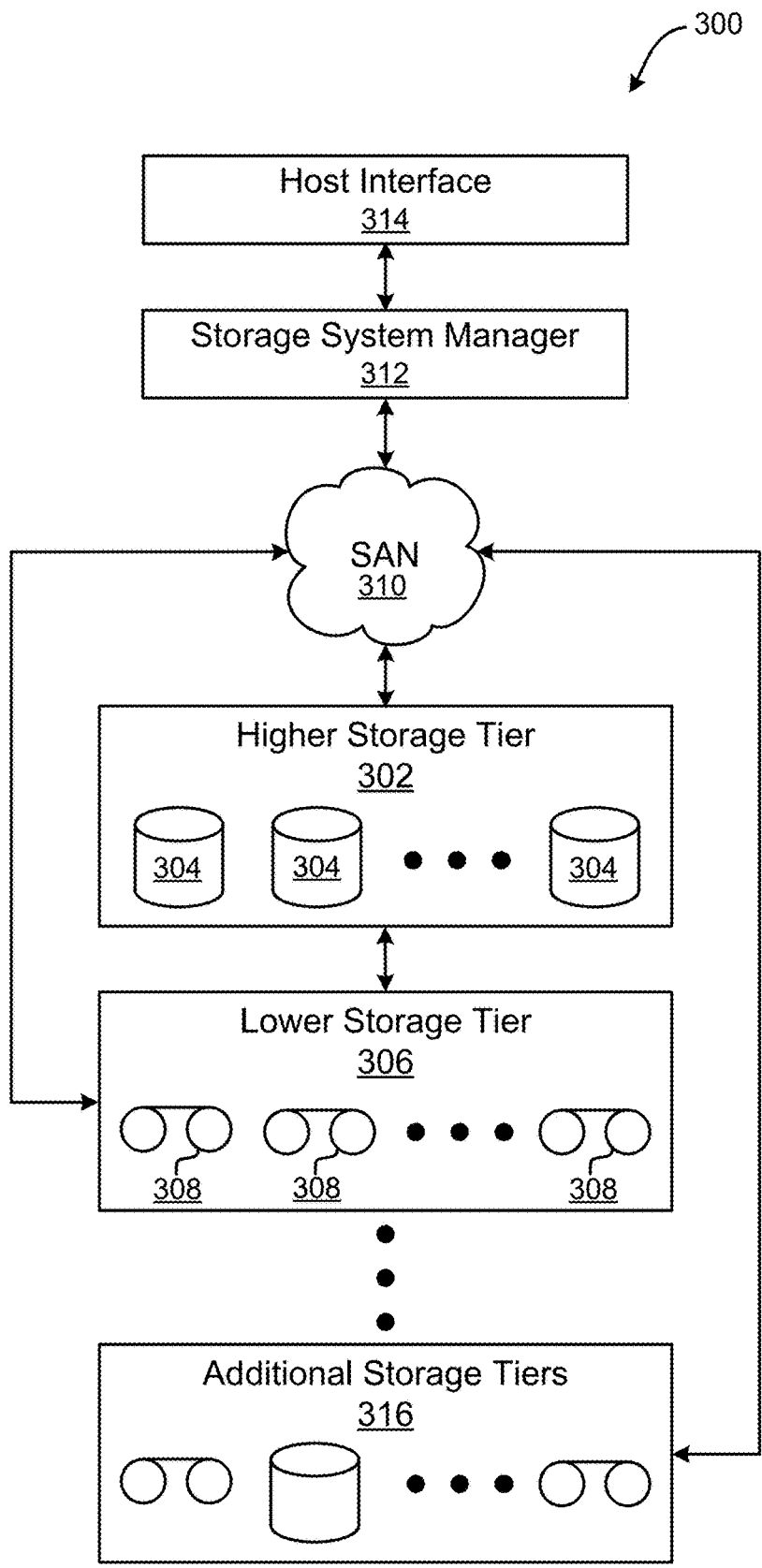
FIG. 3 is a representational view of a tiered data storage system in accordance with one approach.

Now referring to FIG. 3, a storage system 300 is shown according to one approach. Note that some of the elements shown in FIG. 3 may be implemented as hardware and/or software, according to various approaches. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more approaches, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the approaches presented herein.

According to some approaches, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various approaches.

As previously mentioned, extent pools in storage products may implement different extent sizes. Moreover, some workloads may perform better (e.g., more efficiently) in a small extent storage pool when compared to being performed in a large extent storage pool. It follows that while a specific extent size may be chosen by a client for a given storage pool, factors change over time such that a different extent size is more desirable in terms of performance efficiency. For example, in some situations a storage system may experience an increase in demand for physical storage such that it is desirable that smaller extent sized storage pools are converted to larger extent sized storage pools.

However, existing processes for converting the extent size implemented by a given storage pool are time consuming and inefficient. For instance, conventional processes for converting the size of the extents in a storage pool require that the data first be completely migrated off the existing storage pool to another physical storage pool before any changes can be made to the extent sizes. This process of migrating data is particularly undesirable as it requires additional storage resources, processing bandwidth, time to physically copy all data to the alternate storage medium, etc. There is therefore a desire for processes which are able to efficiently convert the size of extents in storage pools.

In sharp contrast to the aforementioned shortcomings experienced by conventional processes, various ones of the approaches included herein are desirably able to convert the extent size of the ranks in a data storage pool while the data remains in place. While this process does include some reordering of data before the actual change to rank extent sizes can occur, the data remains located in the given storage pool while the conversion is performed, thereby significantly increasing operational efficiency, e.g., as will be described in further detail below.

Figure 4A:
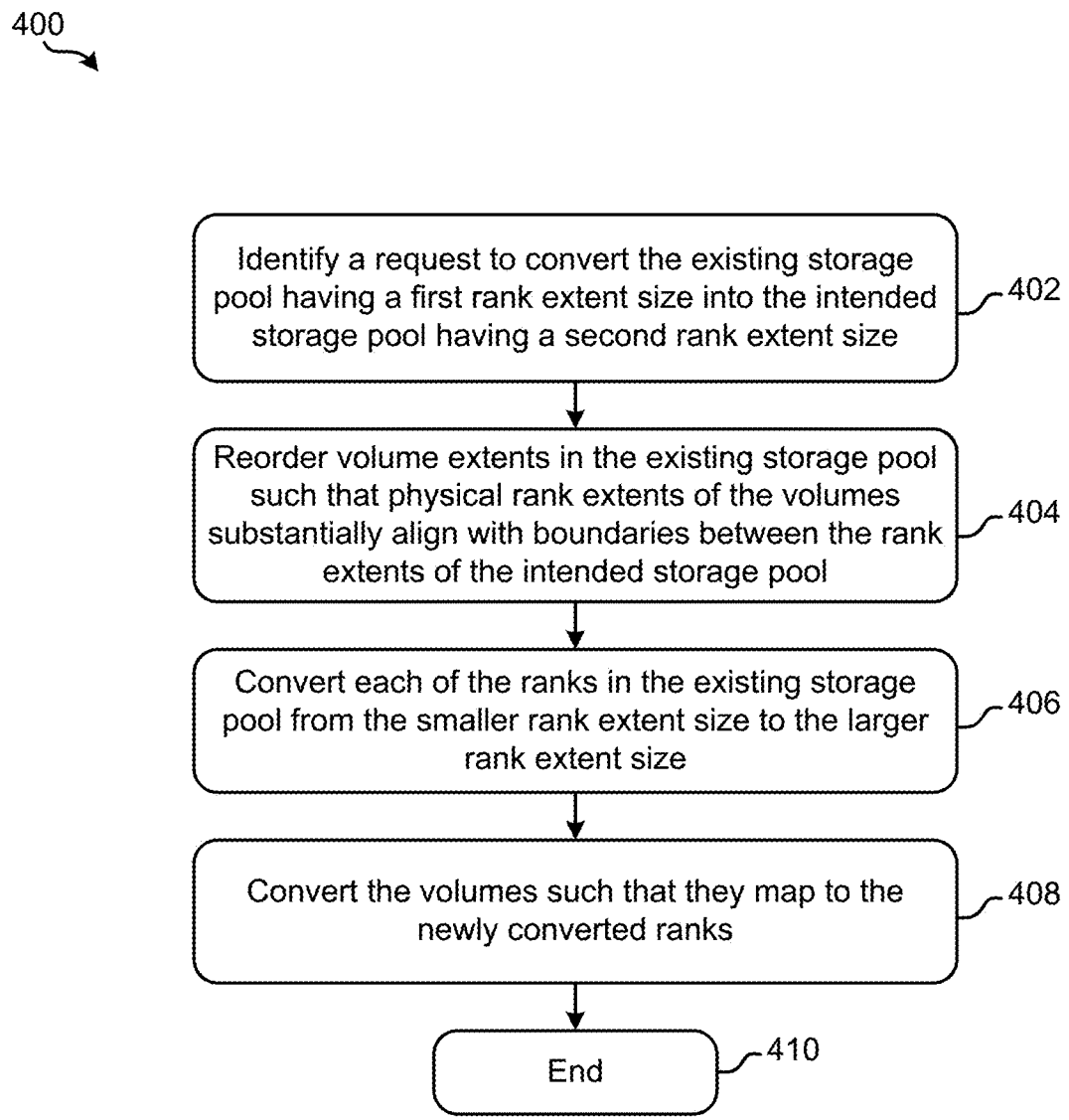
FIG. 4A is a flowchart of a method for converting an existing small extent storage pool into an intended large extent storage pool in place, in accordance with one approach.

Referring now to FIG. 4A, a flowchart of a method 400 for converting an existing small extent storage pool into an intended large extent storage pool in place, is shown according to one approach. The method 400 may be performed in accordance with the present invention in any of the environments depicted in FIGS. 1-3, among others, in various approaches. Of course, more or less operations than those specifically described in FIG. 4A may be included in method 400, as would be understood by one of skill in the art upon reading the present descriptions.

Each of the steps of the method 400 may be performed by any suitable component of the operating environment. For example, in various approaches, the method 400 may be partially or entirely performed by a controller, a processor, a computer, etc., or some other device having one or more processors therein. Thus, in some approaches, method 400 may be a computer-implemented method. Moreover, the terms computer, processor and controller may be used interchangeably with regards to any of the approaches herein, such components being considered equivalents in the many various permutations of the present invention.

Moreover, for those approaches having a processor, the processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4A, operation 402 of method 400 includes identifying a request to convert the existing storage pool having a first rank extent size into the intended storage pool having a second rank extent size. As mentioned above, method 400 involves converting a small extent storage pool into a large extent storage pool. Therefore, with respect to the present description, the "first rank extent size" is smaller than the "second rank extent size" comparatively. For example, the existing storage pool configuration may have rank extents, each having a size of about 16 MB, while the intended storage pool configuration has rank extents, each having a size of about 1 GB. Again, some workloads may perform significantly better in an environment which implements a given extent size. For instance, some workloads perform much more efficiently using a small extent storage pool when compared to being performed using a large extent storage pool. A request to convert the extent size of a given storage pool may therefore be received from a running application in response to a newly initiated workload, from a user in response to evaluating system performance relative to extent size, etc.

It should also be noted that the terms "existing storage pool" and "intended storage pool" are actually referring to different configurations of the same storage pool. In other words, the term "existing storage pool" is intended to refer to the existing state (e.g., smaller rank extent size) of the storage pool, while the "intended storage pool" is intended to refer to the planned target state (e.g., larger rank extent size) of the same storage pool.

As would be appreciated by one skilled in the art, the logical configuration of an exemplary storage pool includes ranks (raid arrays) which contain physical storage, and volumes that map the physical storage to a host addressable range of logically contiguous storage (e.g., such as logical unit number). The rank also includes a rank segment (extent) table (RST), while the volume includes volume segment (extent) tables (VSTs). These tables at least partially control mapping of the different physical extents on ranks to the extents which correspond to the respective volumes, e.g., as will be described in further detail below (e.g., see FIG. 5).

Referring still to FIG. 4A, operation 404 further includes reordering volume extents in the existing storage pool such that physical rank extents of the volumes substantially align with boundaries between the rank extents of the intended storage pool. Increasing the extent size implemented in a given storage pool while keeping the data in place involves re-balancing the arrangement of volume extents such that the volume physical rank extents align along the larger extent boundaries. In other words, re-balancing the volume extents as described allows for the consecutive small extents to align and map to the contiguous space for the larger intended (e.g., planned) extent size, e.g., as would be appreciated by one skilled in the art after reading the present description.

According to preferred approaches, the volume extents in the existing storage pool are reordered such that the physical rank extents of the volumes substantially align with the boundaries between the rank extents of the intended storage pool having larger rank extents. With respect to the present description, it should be noted that "substantially align" is intended to refer to a situation in which the volume extents are reordered such that no padding exists between the volume extents and the boundaries between the rank extents. In other words, it is preferred that the volume extents fill the larger intended rank events without forming any gaps. As a result, the efficiency of storage space utilization is increased, thereby improving performance of an overarching data storage system as a whole. However, in other approaches a tolerance may be implemented which effectively predefines an acceptable amount of padding that may exist between the volume extents and the boundaries between the rank extents.

Reordering the volume extents in place as described above is also desirable as it prevents the data that is actually included in the volumes from being migrated outside the existing storage pool while the existing storage pool is converted it into the intended storage pool having the larger rank extent size. Specifically, the approaches included herein are able to significantly reduce the amount of additional storage resources, processing bandwidth consumed, performance delays, etc., particularly in comparison to conventional procedures.

With continued reference to FIG. 4A, it should be noted that in some approaches the process of reordering the volume extents in the existing storage pool involves reordering the volume extents based on a temperature of data included in each of the volume extents. In other words, in some approaches operation 404 includes using data heat separation in order to determine how the volume extents should be arranged in the storage pool. As a result, volume extents in the existing storage pool which include hot data are grouped together, while volume extents in the existing storage pool which include cold data are grouped together. This further increases the efficiency by which the storage pool is able to operate. However, it should also be noted that data heat separation may be intentionally disabled after the volume extents have been reordered in operation 404 to avoid continued changes to the alignment thereof. Moreover, new extent allocations on a given volume preferably involve allocating consecutive small extents that align to the contiguous large extent ranges.

In other approaches, the process of reordering the volume extents in the existing storage pool involves reordering the volume extents merely based on the total size of the data logically represented by the volume extents However, in other approaches the reordering may be performed randomly, serially, non-serially, etc. In still other approaches, the process of reordering the volume extents may be based on one or more criteria, e.g., such as data retrieval speed of the respective rank. For instance, each of the ranks may be listed in order of decreasing data retrieval speed, and volume extents may be allocated in ranks according to the list (e.g., starting with ranks having a fastest data retrieval speed, etc.).

In response to aligning each of the volumes in the storage pool to the larger intended extent size, the next step is to convert the ranks to the new extent size. Accordingly, operation 406 further includes converting each of the ranks in the existing storage pool from the first rank extent size to the second rank extent size. In other words, operation 406 includes increasing the size of each of the ranks in the existing storage pool to the intended rank size associated with the intended storage pool. In preferred approaches, each of the ranks in the existing storage pool are converted sequentially by progressing from one rank to the next, but is in no way intended to limit the invention. For example, in some approaches the size of two or more ranks may be increased in parallel.

Figure 4B:
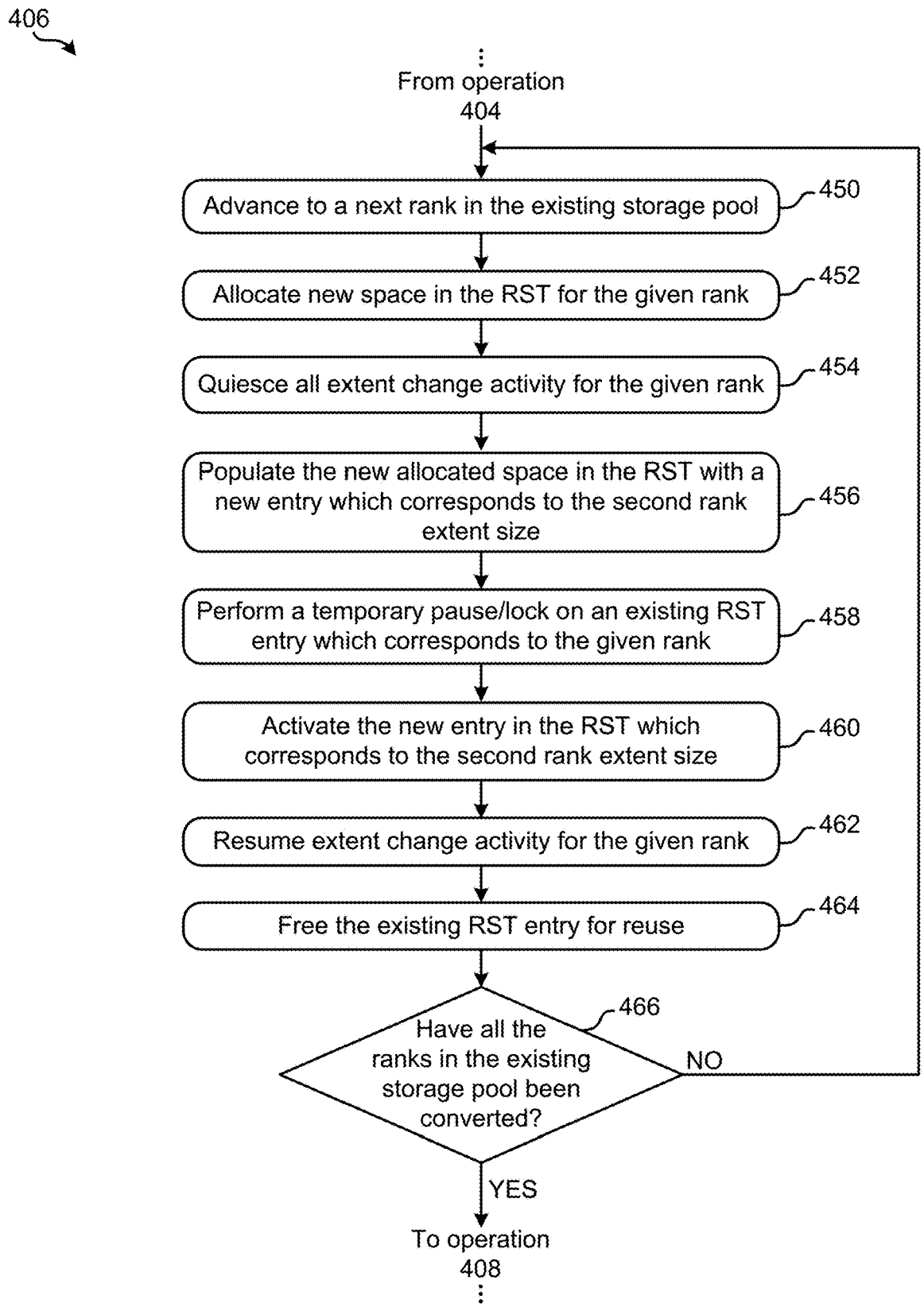
FIG. 4B is a flowchart of sub-processes for one of the operations in the method of FIG. 4A, in accordance with one approach.

The process of increasing the size of a given rank without performing any data migration is desirable as previously mentioned. Referring momentarily to FIG. 4B, exemplary sub-processes of converting each of the ranks in the existing storage pool from the smaller first rank extent size to the larger second rank extent size are illustrated in accordance with an illustrative approach. It follows that any one or more of the sub-processes included in FIG. 4B may be used to perform operation 406 of FIG. 4A. However, it should be noted that the sub-processes of FIG. 4B are illustrated in accordance with one approach which is in no way intended to limit the invention.

As shown, sub-operation 450 involves advancing to a rank in the existing storage pool. For instance, a first iteration of the sub-processes in FIG. 4B may involve advancing to a first rank in the storage pool, while subsequent iterations of the sub-processes in FIG. 4B may involve advancing to a subsequent rank in the storage pool. As noted above, the sub-processes in FIG. 4B may be repeated in an iterative fashion for each of the ranks in the storage pool.

In order to convert the ranks while maintaining data in place, a new table is generated to map to the smaller existing rank extent layout that the volumes already contain. Accordingly, sub-operation 452 includes allocating new RST space and/or entries for the given rank identified in sub-process 450. As noted above, this new allocated RST space and/or entries correspond to the larger intended rank extent size, and therefore may be used to convert the size of the given rank without having to migrate the data stored therein. For example, the newly allocated RST space and/or entries may be populated with a logical location of the data in the volumes which have been reordered to substantially align with the boundaries of the given rank. According to some approaches, this may be accomplished by identifying a volume and a volume extent within that volume where the data is logically stored.

It should also be noted that in preferred approaches the RST is configured on a one-to-one basis extent wise. In other words, each RST entry corresponds to a rank extent of a given size, and points to a corresponding volume extent. For example, in some approaches the extents in the given rank are represented as RST entries for the rank, where each rank extent represents a predetermined amount of storage for storing data within the storage pool. Moreover, the process of allocating new RST space may be performed using any processes which would be apparent to one skilled in the art after reading the present description.

With continued reference to FIG. 4B, sub-operation 454 includes quiescing all extent change activity for the given rank. This allows for the given rank to be converted while the extents included therein are forced to temporarily remain stagnant, thereby avoiding any errors, e.g., as would be appreciated by one skilled in the art. Yet, although extent change activity is quiesced for the given rank, it should be noted that the remaining ranks in the storage pool may be unaffected in some approaches. This desirably allows for the overall storage pool to remain operational while systematically converting the extent size of each of the ranks therein, in addition to avoiding having to migrate data from the pool in order to achieve the conversion.

The flowchart further proceeds to sub-operation 456 which includes populating the new allocated RST space and/or entries with a new entry which corresponds to the second rank extent size. In other words, sub-operation 456 includes populating the new RST entry formed in sub-operation 452 to point to the smaller volume extents which were reordered to align with the boundaries of the given rank according to the intended larger rank extent size. According to some approaches, one or more pointers which reference the relevant volume extents (e.g., using a reference number) may be used to populating the new allocated RST space. However, any desired processes may be implemented, e.g., depending on the desired approach.

Sub-operation 458 further includes performing a temporary pause/lock on an existing RST entry which corresponds to the given rank, while sub-operation 460 includes activating the new RST entry which corresponds (e.g., points) to the second rank extent size. Sub-operation 458 and 460 are thereby able to transition from the existing (e.g., previous) RST entry, to the newly allocated RST entry. According to some approaches, performing a temporary pause/lock on the existing RST entry may involve inspecting all possible threads before the flowchart is able to actually transition to using the newly allocated RST entry.

In response to activating the newly allocated RST entry, sub-operation 462 includes resuming extent change activity for the given rank. Sub-operation 464 additionally includes freeing the existing (e.g., previous) RST entry such that it may be reused as desired. For example, in some approaches freeing the existing RST entry involves releasing the space in the table such that it may be used with respect to other ranks. Moreover, any information (e.g., data, metadata, etc.) stored in the existing RST entry may be deleted.

Proceeding to decision 466, here the flowchart includes determining whether all of the ranks in the existing storage pool have been converted to implement the larger rank extent size. In other words, decision 466 includes determining whether all of the ranks in the existing storage pool have been evaluated. In response to determining that at least one of the ranks in the existing storage pool has not yet been converted to implement the larger rank extent size, the flowchart returns to sub-operation 450. There, sub-operation 450 includes advancing to the next rank that has not yet been converted, e.g., such that the sub-processes illustrated in FIG. 4B may be repeated for that rank. However, in response to determining that all of the ranks in the existing storage pool have been converted to implement the larger rank extent size, the flowchart proceeds to operation 408 of FIG. 4A.

Figure 4C:
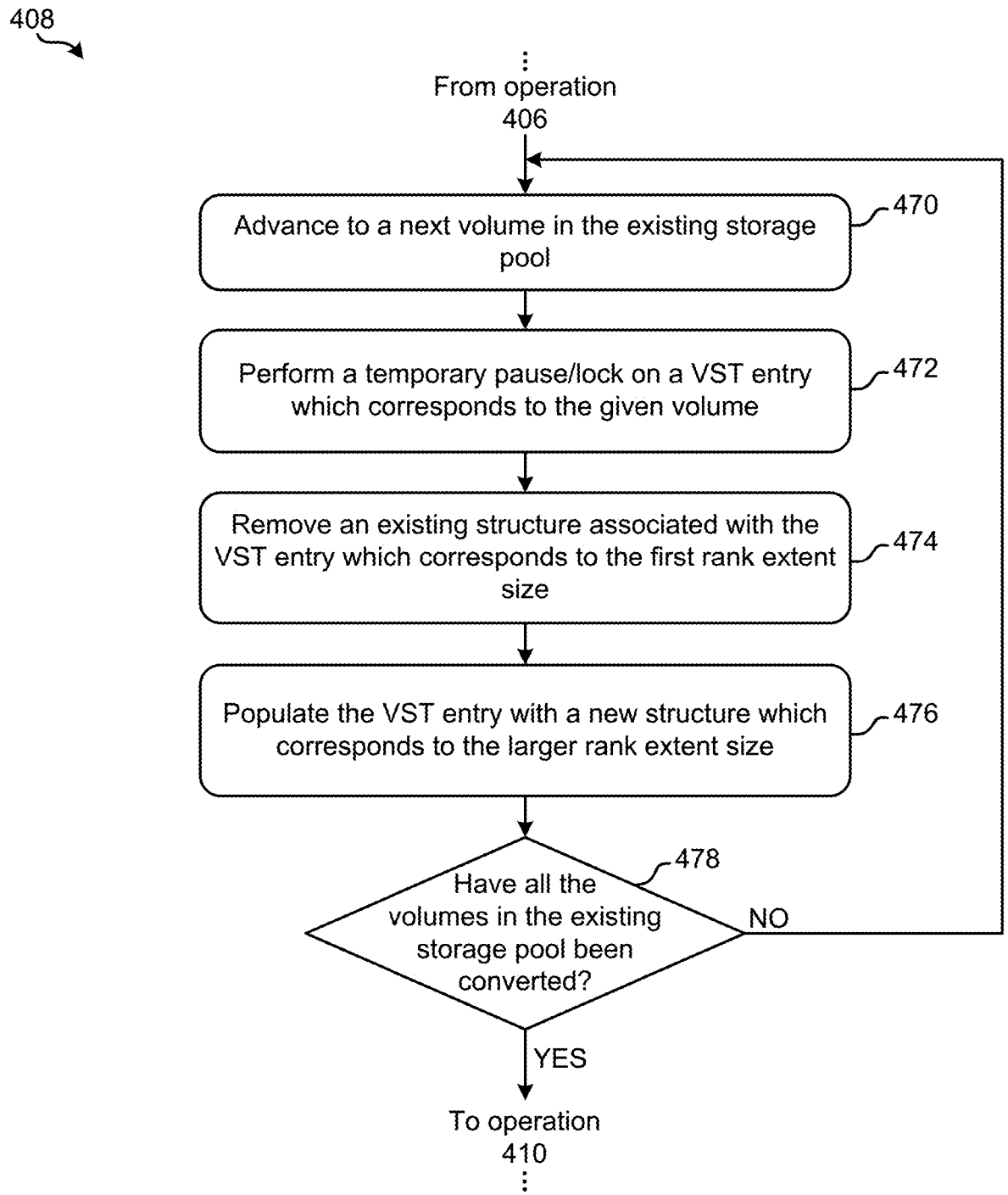
FIG. 4C is a flowchart of sub-processes for one of the operations in the method of FIG. 4A, in accordance with one approach.

Returning to FIG. 4A, operation 408 includes actually converting the volumes such that they map to the newly converted ranks. In other words, after each of the ranks have been converted to implement the larger rank extent size, the volumes themselves are also converted. Referring momentarily to FIG. 4C, exemplary sub-processes of converting the volumes such that they map to the newly converted ranks are illustrated in accordance with an illustrative approach. It follows that any one or more of the sub-processes included in FIG. 4C may be used to perform operation 408 of FIG. 4A. However, it should be noted that the sub-processes of FIG. 4C are illustrated in accordance with one approach which is in no way intended to limit the invention.

As shown, sub-operation 470 includes advancing to a volume in the storage pool. For instance, a first iteration of the sub-processes in FIG. 4C may involve advancing to a first volume in the storage pool, while subsequent iterations of the sub-processes in FIG. 4C may involve advancing to a subsequent volume in the storage pool. As noted above, the sub-processes in FIG. 4C may be repeated in an iterative fashion for each of the volumes in the storage pool.

Proceeding to sub-operation 472, a temporary pause/lock is performed on a VST entry which corresponds to the given volume. According to some approaches, performing the temporary pause/lock includes checking each of the possible threads that are associated with the VST entry at issue.

Moreover, sub-operation 474 includes removing an existing structure associated with the VST entry which corresponds to (e.g., points to) the first rank extent size. As mentioned above, each of the volumes are preferably converted such that they map to the newly converted ranks having the larger rank extent size. In order to do so, any existing structures which map a given volume to the original configuration of the rank having the smaller rank extent size are preferably removed. This effectively removes the existing VST structure which formed the smaller rank extent sizes, thereby allowing for the larger rank extent sizes to be implemented.

In response to removing the existing structure, sub-operation 476 further includes populating the VST entry with a new structure which corresponds to the larger rank extent size. As a result, the VST entry will point to the physical rank extent (e.g., the starting extent number for the physical extent) having the larger rank extent size. The VST entry is able to point to the starting extent number for the physical extent in preferred approaches because the volume extent numbering uses the minimum extent unit. Moreover, as described above, extents are physically packed together without padding in some approaches, e.g., as would be appreciated by one skilled in the art after reading the present description.

According to some approaches, which are in no way intended to limit the invention, the VST entry may be populated with a new structure which corresponds to the larger rank extent size by creating a correspondence between logical volume extents of the volume and physical offset locations in the respective rank extent(s) of the storage pool. Creating the correspondence may include identifying VST entries in the volume that correspond to the respective rank extent(s) that have been converted to the larger size. For example, a VST may store a logical representation of data stored in the volume, where the VST includes a plurality of entries. A subset of these entries may be identified within the VST that correspond to the respective rank extent(s).

In other approaches, creating the correspondence may include creating a supplemental VST for each identified VST entry. For example, for each of the identified subset of VST entries, a supplemental VST may be created. In another example, each of the supplemental VSTs may be used to represent all of the logical volume extents within their corresponding VST entry at a higher granularity. In still other approaches, creating the correspondence may include setting the logical volume extents within the supplemental VSTs to point to corresponding offset locations within the converted rank extents. In this way, a direct correspondence may be established between the logical volume extents of the supplemental VSTs of the volume and the offset locations within the rank extents.

Proceeding to decision 478, here the flowchart includes determining whether all of the volumes in the existing storage pool have been converted. In other words, decision 478 includes determining whether all of the volumes in the existing storage pool have been converted such that they map to the newly converted ranks. In response to determining that at least one of the volumes has not yet been converted, the flowchart returns to sub-operation 470. There, sub-operation 470 includes advancing to the next volume that has not yet been converted, e.g., such that the sub-processes illustrated in FIG. 4C may be repeated for that volume. However, in response to determining that all of the volumes in the existing storage pool have been converted according to the larger rank extent sizes, the flowchart proceeds to operation 410 of FIG. 4A.

Returning again to FIG. 4A, the flowchart proceeds to operation 410 after all ranks and volumes have been converted, whereby method 400 may end. Accordingly, it may be concluded that the storage pool has effectively been converted from an existing small extent storage pool into an intended large extent storage pool in response to reaching operation 410. However, it should be noted that although method 400 may end upon reaching operation 410, any one or more of the processes included in method 400 may be repeated in order to convert another storage pool. In other words, any one or more of the processes included in method 400 may be repeated for converting another existing small extent storage pool into an intended large extent storage pool in place.

It follows that the various processes and sub-processes included in FIGS. 4A-4C are able to convert the extent size of the ranks in a data storage pool while the data remains in place. While this process does include some reordering of data before the actual change to rank extent sizes can occur, the data remains located in the given storage pool while the conversion is performed, thereby significantly increasing operational efficiency, reducing data storage consumption, decreasing performance delays, reducing network traffic (e.g., which would otherwise result from migrating the data), etc. These improvements are achieved due (at least in part) to the fact that the properties of the volumes allow for these various processes and sub-processes to convert the layout of the volumes and ranks into larger extent sizes. As noted above, the properties of the RST and VST tables allow for this to be achieved such that no migration of data to other storage pools or machines is involved.

Figure 5:
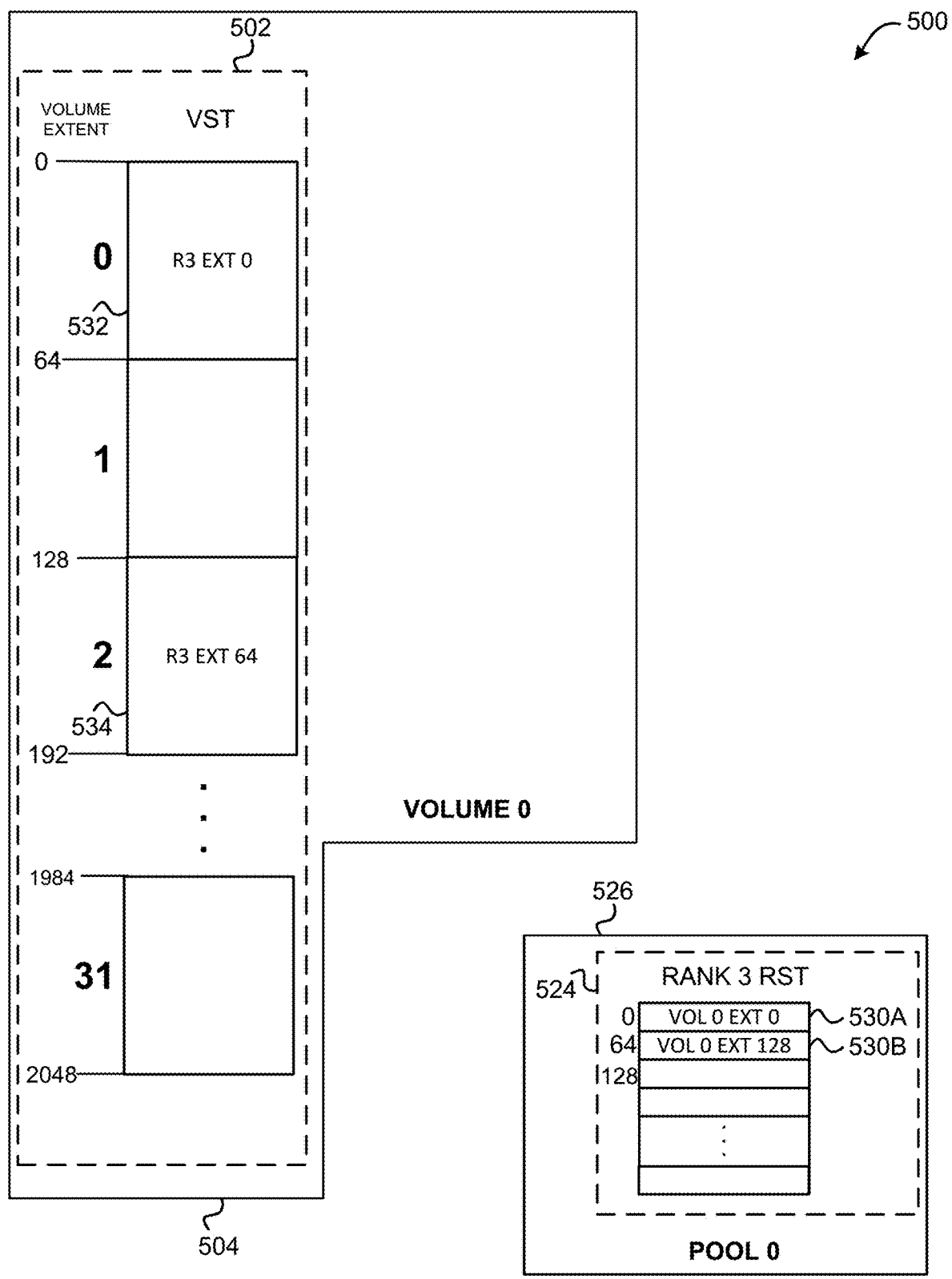
FIG. 5 illustrates a representational view of a storage environment, in accordance with one approach.

Referring momentarily now to FIG. 5, an exemplary storage environment 500 is illustrated according to one approach. As an option, the present storage environment 500 may be implemented in conjunction with features from any other approach listed herein, such as those described with reference to the other FIGS., such as FIGS. 4A-4C. However, such storage environment 500 and others presented herein may be used in various applications and/or in permutations which may or may not be specifically described in the illustrative approaches listed herein. Further, the storage environment 500 presented herein may be used in any desired environment. Thus FIG. 5 (and the other FIGS.) may be deemed to include any possible permutation.

As shown, a VST 502 stores a logical representation of data stored within a volume 0 504. Additionally, one or more RSTs store a physical representation of the data as stored within a rank 3 524 of an existing storage pool 0 526. It should also be noted that the rank granularity of existing storage pool 0 526 is 16 MB according to the present approach. For example, each rank extent within existing storage pool 0 526 has a size of about 16 MB. However, these rank extents may be converted from a size of about 16 MB to about 1 GB, e.g., using any one or more of the approaches included herein (e.g., see FIGS. 4A-4C above).

Referring still to FIG. 5, full volume extent VST entries 532 and 534 refer to locations 530A-530B within the RSTs where data is physically stored in existing storage pool 0 526. For example, rank extent 0 530A of rank 3 524 of existing storage pool 0 526 includes a link to VST entry 0 532 within volume 0 504. Conversely, VST entry 0 532 within volume 0 504 includes a link to rank extent 0 530A of rank 3 524 of existing storage pool 0 526.

Likewise, rank extent 64 530B of rank 3 524 of existing storage pool 0 526 includes a link to VST entry 2 534 within volume 0 504. Conversely, VST entry 2 534 within volume 0 504 includes a link to rank extent 64 530B of rank 3 524 of existing storage pool 0 526. In this way, a connection between a logical representation of data in volume 0 504 is mapped to a physical representation of data in existing storage pool 0 526.

Again, extent pools in storage products may have different extent sizes. For example, a DS8000 data storage platform may implement a 1 GB extent size for a larger sized pool and a 16 MB extent size for a smaller sized pool. Moreover, as previously mentioned, some workloads perform better using small pools, while others perform better in large extent pools. It follows that the various approaches included herein may be used to improve performance by adjusting the extent size implemented in a given pool.

According to an in-use example, which is in no way intended to limit the invention, an RST is used as a mapping table for a rank (array) describing the state of rank extents and the logical volume extents that the physical rank extents belong to. For instance, say rank "rO" is 1 T, and the extent size is 1 G, then this RST table would have 1024 entries, with each entry representing one physical extent. If rank extent 0 is allocated to logical extent 1 of volume 0x1010, then the entry in RST will have information indicating that the physical extent state is allocated, and it is allocated to logical extent 1 of volume 0x1010.

Moreover, a VST is used as a mapping table for volumes which maps the logical extent of the volume to the physical extent of the rank, so that the physical location may be easily identified when host I/O arrives which is on a volume LBA boundary, e.g., as would be appreciated by one skilled in the art after reading the present description.

Further, in an illustrative approach, a Small VST (smVST) may be used as a mapping table for a volume that contains 64 entries with each entry map a small logical extent (16 MB) to the physical extent of the rank, so that a physical location may be identified when a host I/O arrives which is on a volume LBA boundary. Further still, in one approach, only an RST is persistent in disks, and a VST is built and loaded into memory on demand based on the RST.

While a number of the approaches included herein are able to convert storage pools having smaller extent sizes into storage pools having larger extent sizes (at least in comparison to the smaller extent sizes), other ones of the approaches herein are able to convert storage pools having larger extent sizes into storage pools having smaller extent sizes. As noted above, conventional process of converting the extent size implemented by a given storage pool have proven to be inefficient in terms of performance delays, resource consumption, etc. For instance, conventional processes for converting the size of the extents in a storage pool require that the data first be completely migrated off the existing storage pool to another physical storage pool before any changes can be made to the extent sizes. This conventional process of migrating data is particularly undesirable as it requires additional storage resources, processing bandwidth, time to physically copy all data to the alternate storage medium, etc.

In sharp contrast to these conventional shortcomings, various ones of the approaches included herein are desirably able to convert the extent size of the ranks in a data storage pool while the data remains in place. Specifically, some of the approaches included herein are able to increase the extent size implemented by a given storage pool, thereby significantly increasing operational efficiency, e.g., as will be described in further detail below.

Figure 6A:
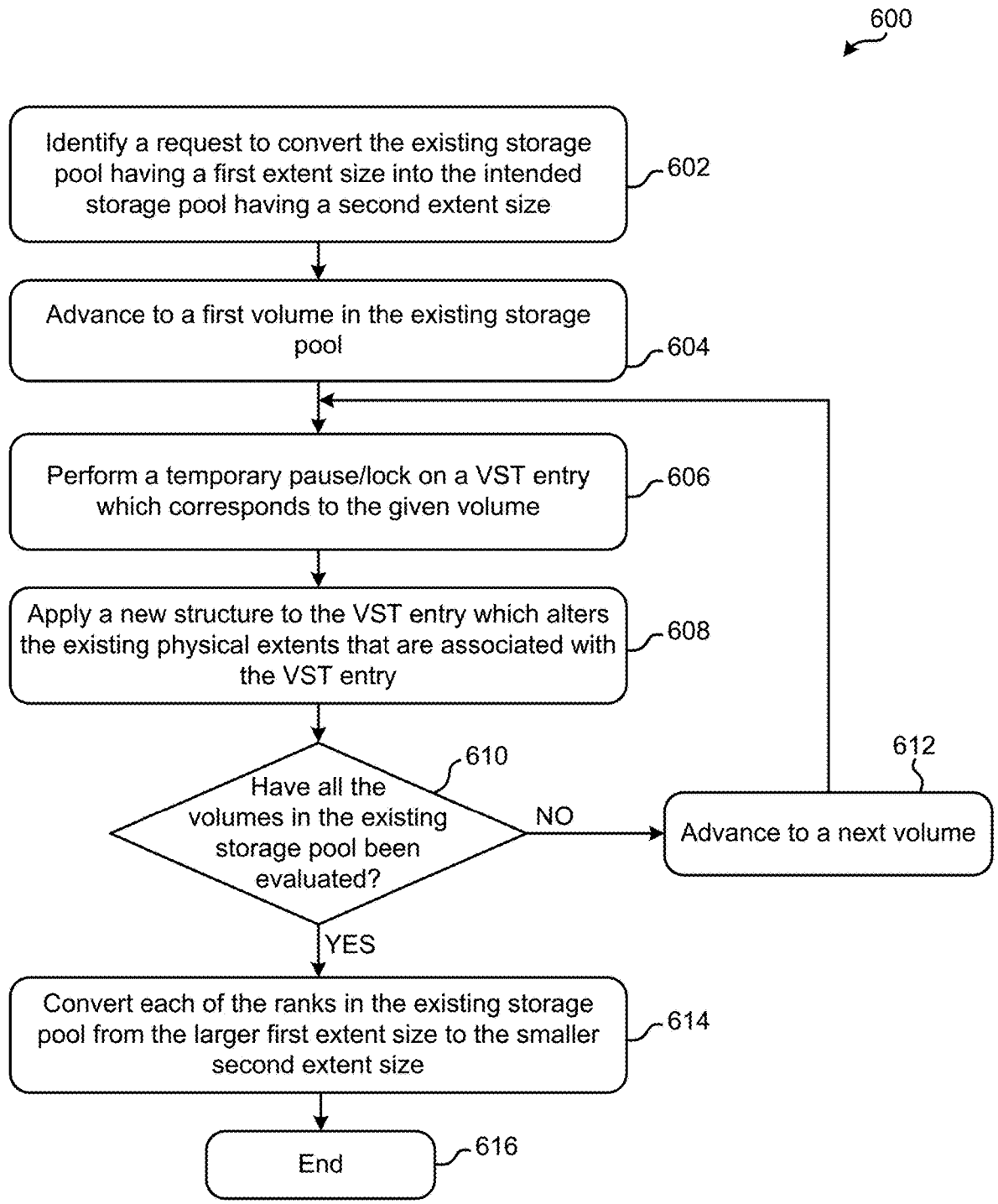
FIG. 6A is a flowchart of a method for converting an existing large extent storage pool into an intended small extent storage pool in place, in accordance with one approach.

Referring now to FIG. 6A, a flowchart of a method 600 for converting an existing storage pool having a larger extent size into an intended storage pool having a smaller extent size in place, is shown according to one approach. The method 600 may be performed in accordance with the present invention in any of the environments depicted in FIGS. 1-5, among others, in various approaches. Of course, more or less operations than those specifically described in FIG. 6A may be included in method 600, as would be understood by one of skill in the art upon reading the present descriptions.

Each of the steps of the method 600 may be performed by any suitable component of the operating environment. For example, in various approaches, the method 600 may be partially or entirely performed by a controller, a processor, a computer, etc., or some other device having one or more processors therein. Thus, in some approaches, method 600 may be a computer-implemented method. Moreover, the terms computer, processor and controller may be used interchangeably with regards to any of the approaches herein, such components being considered equivalents in the many various permutations of the present invention.

Moreover, for those approaches having a processor, the processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6A, operation 602 of method 600 includes identifying a request to convert the existing storage pool having a first extent size into the intended storage pool having a second extent size. As noted above, in the present approach the first extent size which corresponds to the existing storage pool is larger than the second extent size corresponding to the intended storage pool. Therefore, with respect to the present description, the "first extent size" is larger than the "second extent size" comparatively. For example, the existing storage pool configuration may have extents, each having a size of about 1 GB, while the intended storage pool configuration has extents, each having a size of about 16 MB. Again, some workloads may perform significantly better in an environment which implements a given extent size. For instance, some workloads perform much more efficiently using a storage pool having smaller extents when compared to being performed using a storage pool having larger extents. A request to convert the extent size of a given storage pool may therefore be received from a running application in response to a newly initiated workload, from a user in response to evaluating system performance relative to extent size, etc.

It should also be noted that the terms "existing storage pool" and "intended storage pool" are actually referring to different configurations of the same storage pool. In other words, the term "existing storage pool" is intended to refer to the existing state (e.g., larger extent size) of the storage pool, while the "intended storage pool" is intended to refer to the planned target state (e.g., smaller extent size) of the same storage pool.

As would be appreciated by one skilled in the art, the logical configuration of an exemplary storage pool includes ranks (raid arrays) which contain physical storage, and volumes that map the physical storage to a host addressable range of logically contiguous storage (e.g., such as logical unit number). The rank also includes a rank segment (extent) table (RST), while the volume includes volume segment (extent) tables (VSTs). These tables at least partially control mapping of the different physical extents on ranks to the extents which correspond to the respective volumes (e.g., see FIG. 5 above).

Referring still to FIG. 6A, operation 604 includes advancing to a first volume in the existing storage pool, while operation 606 includes performing a temporary pause/lock on a volume segment table (VST) entry which corresponds to the given volume. According to the present description, the "first volume" may include any of the volumes in the existing storage pool. For instance, depending on the approach, the first volume may be identified randomly, based on a comparison between the volumes in the existing storage pool, predetermined by a user, etc. As will soon become apparent, each of the volumes in the existing storage pool are preferably evaluated and therefore the order in which method 600 progresses through the volumes does not affect the resulting storage pool in some approaches.

Performing the temporary pause/lock on the VST entry effectively prevents access to the given VST and/or associated volume such that adjustments may be made without experiencing any errors. The process of performing the temporary pause/lock on the VST entry includes checking each of the possible threads that are associated with the VST entry at issue in some approaches. In other approaches, the temporary pause/lock may be performed on the given VST entry by setting a flag, temporarily invalidating an address associated with the entry, etc., or any other processes which would be apparent to one skilled in the art after reading the present description.

Method 600 further includes applying a new structure to the VST entry which alters the existing physical extents that are associated with the VST entry. See operation 608. The new structure applied to (e.g., snapped onto) the VST entry preferably divides existing physical extents associated with the VST entry into two or more smaller physical extents. In other words, the new VST entry effectively creates the new physical extents and the corresponding references thereto.

These smaller physical extents are preferably formed such that they correspond to the smaller second rank size of the intended storage pool. In other words, the new structure that is applied to the VST entry is preferably configured such that it divides the existing physical extent into a number of smaller extents which correspond to the characteristics of the intended storage pool. According to an exemplary approach, which is in no way intended to limit the invention, each of the physical extents associated with the VST entry may have a size of about 1 gigabyte prior to applying the new structure. In response to applying the new structure however, each of the altered physical extents associated with the new structure that is applied to the VST entry may have a size of about 16 megabytes, but may be higher or lower depending on the desired approach.

The smaller physical extents also preferably align with the boundaries between the extents of the intended storage pool without any padding. In other words, the smaller physical extents are formed from the existing physical extents such that the smaller physical extents do not extend across the boundaries between extents. The process of applying the new structure and forming the new (smaller) physical extents may also include performing renumbering of the extents and/or establishing offsets therein, e.g., as would be appreciated by one skilled in the art after reading the present description.

From operation 608, method 600 proceeds to decision 610 which includes determining whether all of the volumes in the existing storage pool been evaluated. In response to determining that at least one of the volumes in the existing storage pool has not yet been evaluated, method 600 proceeds to operation 612. There, operation 612 includes advancing to a next volume in the existing storage pool before returning to operation 606 such that a temporary pause/lock is performed on the next volume. It follows that processes 606-612 may be repeated in an iterative fashion for all of the volumes in the existing storage pool.

Returning to decision 610, method jumps to operation 614 in response to determining that all of the volumes in the existing storage pool been evaluated and had the existing physical extents thereof divided into smaller physical extents. There, operation 614 includes converting each of the ranks in the existing storage pool from the larger first extent size to the smaller second extent size. In other words, operation 614 includes reducing the size of each of the ranks in the existing storage pool to the intended rank size associated with the intended storage pool. In preferred approaches, each of the ranks in the existing storage pool are converted sequentially by progressing from one rank to the next, but is in no way intended to limit the invention. For example, in some approaches the size of two or more ranks may be decreased in parallel.

Figure 6B:
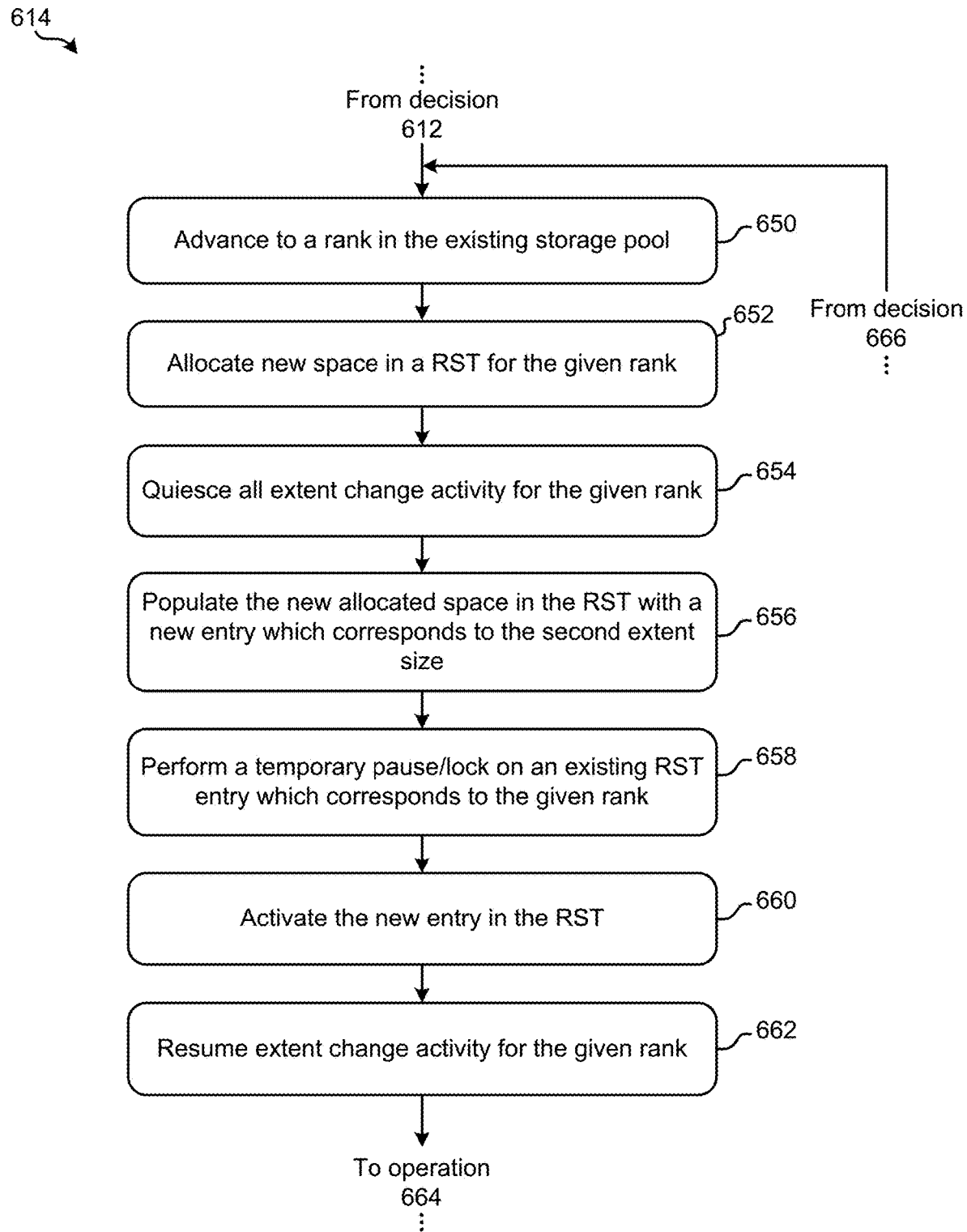
FIG. 6B is a flowchart of sub-processes for one of the operations in the method of FIG. 6A, in accordance with one approach.
Figure 6B:
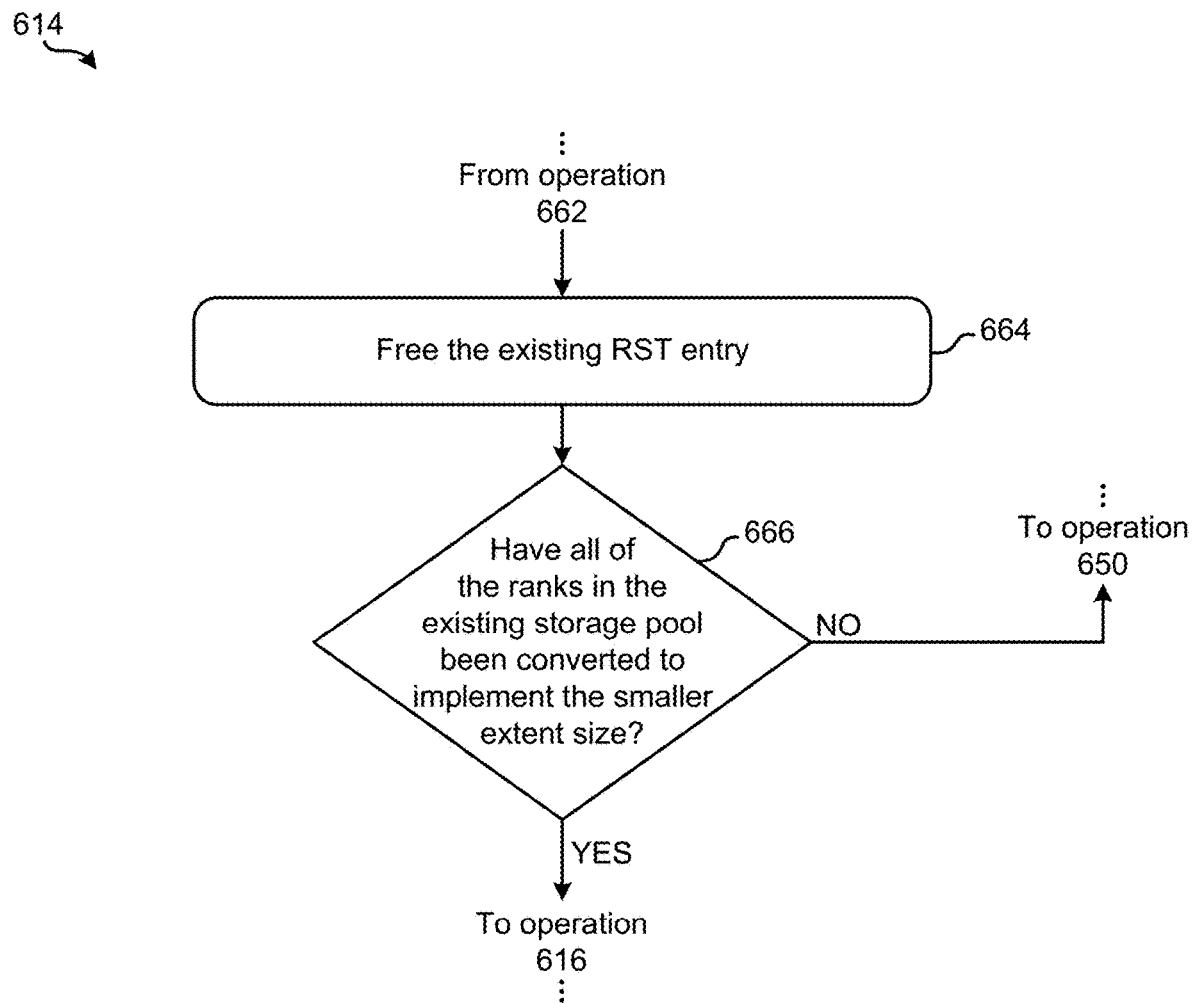

The process of decreasing the size of a given rank without performing any data migration is desirable as mentioned herein. Referring momentarily to FIG. 6B, exemplary sub-processes of converting each of the ranks in the existing storage pool from the larger first rank extent size to the smaller second rank extent size are illustrated in accordance with an illustrative approach. It follows that any one or more of the sub-processes included in FIG. 6B may be used to perform operation 614 of FIG. 6A. However, it should be noted that the sub-processes of FIG. 6B are illustrated in accordance with one approach which is in no way intended to limit the invention.

As shown, sub-operation 650 involves advancing to a rank in the existing storage pool. For instance, a first iteration of the sub-processes in FIG. 6B may involve advancing to a first rank in the storage pool, while subsequent iterations of the sub-processes in FIG. 6B may involve advancing to a subsequent rank in the storage pool. As noted above, the sub-processes in FIG. 6B may be repeated in an iterative fashion for each of the ranks in the storage pool.

In order to convert the ranks while maintaining data in place, a new table is generated to map to the smaller extent layout that the volumes have been converted to include (e.g., see operation 608 above). Accordingly, sub-operation 652 includes allocating new RST space and/or entries for the given rank identified in sub-process 650. As noted above, this newly allocated RST space and/or entries corresponds to the smaller intended extent size, and therefore may be used in the process of converting the size of the given extent without having to migrate the data stored therein. For example, the newly allocated RST space and/or entries may be populated with a logical location of the data in the volumes which have been formed from the previous larger extent. According to some approaches, this may be accomplished by identifying a volume and a volume extent within that volume where the data is logically stored.

It should also be noted that in preferred approaches the RST is configured on a one-to-one basis extent wise. In other words, each RST entry corresponds to a rank extent of a given size, and points to a corresponding volume extent. For example, in some approaches the extents in the given rank are represented as RST entries for the rank, where each rank extent represents a predetermined amount of storage for storing data within the storage pool. Moreover, the process of allocating new RST space may be performed using any processes which would be apparent to one skilled in the art after reading the present description.

With continued reference to FIG. 6B, sub-operation 654 includes quiescing all extent change activity for the given rank. This allows for the given rank to be converted while the extents included therein are forced to temporarily remain stagnant, thereby avoiding any errors, e.g., as would be appreciated by one skilled in the art. Yet, although extent change activity is quiesced for the given rank, it should be noted that the remaining ranks in the storage pool may be unaffected in some approaches. This desirably allows for the overall storage pool to remain operational while systematically converting the extent size of each of the ranks therein, in addition to avoiding having to migrate data from the pool during the conversion in order to form the intended storage pool.

The flowchart further proceeds to sub-operation 656 which includes populating the new allocated RST space with a new entry which corresponds to the second extent size. In other words, sub-operation 656 includes populating the new RST entry formed in sub-operation 652 to point to the smaller volume extents which were formed as a result of applying the new structure to the corresponding VST entry having a larger volume extent. According to some approaches, one or more pointers which reference the relevant volume extents (e.g., using a reference number) may be used to populating the new allocated RST space. However, any desired processes may be implemented, e.g., depending on the desired approach.

Sub-operation 658 further includes performing a temporary pause/lock on an existing RST entry which corresponds to the given rank, while sub-operation 660 includes activating the new RST entry formed in sub-operation 652. Sub-operations 658 and 660 are thereby able to smoothly transition from the existing (e.g., previous) RST entry, to the newly allocated RST entry. According to some approaches, performing a temporary pause/lock on the existing RST entry may involve inspecting all possible threads before the flowchart is able to actually transition to using the newly allocated RST entry.

In response to activating the newly allocated RST entry, sub-operation 662 includes resuming extent change activity for the given rank. Sub-operation 664 additionally includes freeing the existing (e.g., previous) RST entry such that it may be reused as desired. For example, in some approaches freeing the existing RST entry involves releasing the space in the table such that it may be used with respect to other ranks. Moreover, any information (e.g., data, metadata, etc.) stored in the existing RST entry may be deleted.

Proceeding to decision 666, here the flowchart includes determining whether all of the ranks in the existing storage pool have been converted to implement the smaller extent size. In other words, decision 666 includes determining whether all of the ranks in the existing storage pool have been evaluated. In response to determining that at least one of the ranks in the existing storage pool has not yet been converted to implement the larger extent size, the flowchart returns to sub-operation 650. There, sub-operation 650 includes advancing to the next rank that has not yet been converted, e.g., such that the sub-processes illustrated in FIG. 6B may be repeated for that rank.

However, in response to determining that all of the ranks in the existing storage pool have been converted to implement the smaller extent size, the flowchart proceeds to operation 616 of FIG. 6A, whereby method 600 may end. Accordingly, it may be concluded that the storage pool has effectively been converted from an existing large extent storage pool into an intended small extent storage pool in response to reaching operation 616. However, it should be noted that although method 600 may end upon reaching operation 616, any one or more of the processes included in method 600 may be repeated in order to convert another storage pool. In other words, any one or more of the processes included in method 600 may be repeated for converting another existing small extent storage pool into an intended large extent storage pool in place.

It follows that the various processes and sub-processes included in FIGS. 6A-6B are able to convert the extent size of the ranks in a data storage pool while the data remains in place. This allows for significant improvements to be achieved for the overarching storage system, e.g., such as increased operational efficiency, reduced data storage consumption, decreased performance delays, reduced network traffic (e.g., which would otherwise result from migrating the data), etc. These improvements are accomplished due (at least in part) to the fact that the properties of the volumes allow for these various processes and sub-processes to convert the layout of the volumes and ranks into smaller extent sizes in place. Once again, the properties of the RST and/or VST allow for this to be achieved using tables, and such that no migration of data to other storage pools or machines is involved.

Again, extent pools in storage products may implement different extent sizes. Moreover, some workloads may perform better (e.g., more efficiently) in a small extent storage pool when compared to being performed in a large extent storage pool. It follows that while a specific extent size may be chosen by a client for a given storage pool, factors change over time such that a different extent size is more desirable in terms of performance efficiency. For example, in some situations a storage system may experience an increase in demand for physical storage such that it is desirable that smaller extent sized storage pools are converted to larger extent sized storage pools. It follows that some of the approaches included herein may be implemented in order to efficiently adjust the extent size implemented by a storage pool in place without performing any physical migration of the data stored therein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for converting an existing storage pool into an intended storage pool in place, comprising:
    identifying a request to convert the existing storage pool having a first extent size into the intended storage pool having a second extent size, wherein the first extent size is larger than the second extent size;
    for each volume in the existing storage pool:
        performing a temporary pause/lock on a volume segment table (VST) entry which corresponds to the given volume,
        applying a new structure to the VST entry, wherein the new structure divides existing physical extents associated with the VST entry into two or more smaller physical extents; and
    for each of the ranks in the existing storage pool, converting the given rank from the first extent size to the second extent size.

2. The computer-implemented method of claim 1, wherein converting the given rank from the first extent size to the second extent size includes:
    allocating new space in a rank segment table (RST);
    quiescing extent change activity for the given rank;
    populating the new allocated RST space with a new entry which corresponds to the second extent size;
    performing a temporary pause/lock on an existing RST entry which corresponds to the given rank; and
    resuming extent change activity for the given rank.

3. The computer-implemented method of claim 2, wherein converting the given rank from the first extent size to the second extent size includes:
    freeing the existing RST entry.

4. The computer-implemented method of claim 2, wherein the RST is configured such that each RST entry corresponds to a rank extent of a given size, and points to a corresponding volume extent.

5. The computer-implemented method of claim 1, wherein the new structure divides existing physical extents associated with the VST entry into two or more smaller physical extents such that the smaller physical extents align with the boundaries between the extents of the intended storage pool without any padding.

6. The computer-implemented method of claim 1, wherein data in the volumes is not migrated outside the existing storage pool while converting the existing storage pool into the intended storage pool.

7. The computer-implemented method of claim 1, wherein the first extent size is about 1 gigabyte, wherein the second extent size is about 16 megabytes.

8. A computer program product for converting an existing storage pool into an intended storage pool in place, the computer program product comprising a computer readable storage medium having program instructions embodied therewith, the program instructions readable and/or executable by a processor to cause the processor to:
    identify, by the processor, a request to convert the existing storage pool having a first extent size into the intended storage pool having a second extent size, wherein the first extent size is larger than the second extent size;
    for each volume in the existing storage pool:
        perform, by the processor, a temporary pause/lock on a volume segment table (VST) entry which corresponds to the given volume,
        apply, by the processor, a new structure to the VST entry, wherein the new structure divides existing physical extents associated with the VST entry into two or more smaller physical extents; and
    for each of the ranks in the existing storage pool, convert, by the processor, the given rank from the first extent size to the second extent size.

9. The computer program product of claim 8, wherein converting the given rank from the first extent size to the second extent size includes:
    allocating new space in a rank segment table (RST);
    quiescing extent change activity for the given rank;
    populating the new allocated RST space with a new entry which corresponds to the second extent size;
    performing a temporary pause/lock on an existing RST entry which corresponds to the given rank; and
    resuming extent change activity for the given rank.

10. The computer program product of claim 9, wherein converting the given rank from the first extent size to the second extent size includes:
    freeing the existing RST entry.

11. The computer program product of claim 9, wherein the RST is configured such that each RST entry corresponds to a rank extent of a given size, and points to a corresponding volume extent.

12. The computer program product of claim 8, wherein the new structure divides existing physical extents associated with the VST entry into two or more smaller physical extents such that the smaller physical extents align with the boundaries between the extents of the intended storage pool without any padding.

13. The computer program product of claim 8, wherein data in the volumes is not migrated outside the existing storage pool while converting the existing storage pool into the intended storage pool.

14. The computer program product of claim 8, wherein the first extent size is about 1 gigabyte, wherein the second extent size is about 16 megabytes.

15. A system, comprising:
    a processor; and
    logic integrated with the processor, executable by the processor, or integrated with and executable by the processor, the logic being configured to:
        identify, by the processor, a request to convert the existing storage pool having a first extent size into the intended storage pool having a second extent size, wherein the first extent size is larger than the second extent size;

for each volume in the existing storage pool:
perform, by the processor, a temporary pause/lock on a volume segment table (VST) entry which corresponds to the given volume,
apply, by the processor, a new structure to the VST entry, wherein the new structure divides existing physical extents associated with the VST entry into two or more smaller physical extents; and for each of the ranks in the existing storage pool, convert, by the processor, the given rank from the first extent size to the second extent size.

16. The system of claim 15, wherein converting the given rank from the first extent size to the second extent size includes:
allocating new space in a rank segment table (RST);
quiescing extent change activity for the given rank;
populating the new allocated RST space with a new entry which corresponds to the second extent size;
performing a temporary pause/lock on an existing RST entry which corresponds to the given rank; and
resuming extent change activity for the given rank,
wherein data in the volumes is not migrated outside the existing storage pool while converting the existing storage pool into the intended storage pool.

17. The system of claim 16, wherein converting the given rank from the first extent size to the second extent size includes:
freeing the existing RST entry.

18. The system of claim 16, wherein the RST is configured such that each RST entry corresponds to a rank extent of a given size, and points to a corresponding volume extent.

19. The system of claim 15, wherein the new structure divides existing physical extents associated with the VST entry into two or more smaller physical extents such that the smaller physical extents align with the boundaries between the extents of the intended storage pool without any padding.

20. The system of claim 15, wherein the first extent size is about 1 gigabyte, wherein the second extent size is about 16 megabytes.

* * * * *